Feb. 9, 1926.  J. PETERSON ET AL  1,572,806
WHEEL ATTACHMENT
Filed June 19, 1925
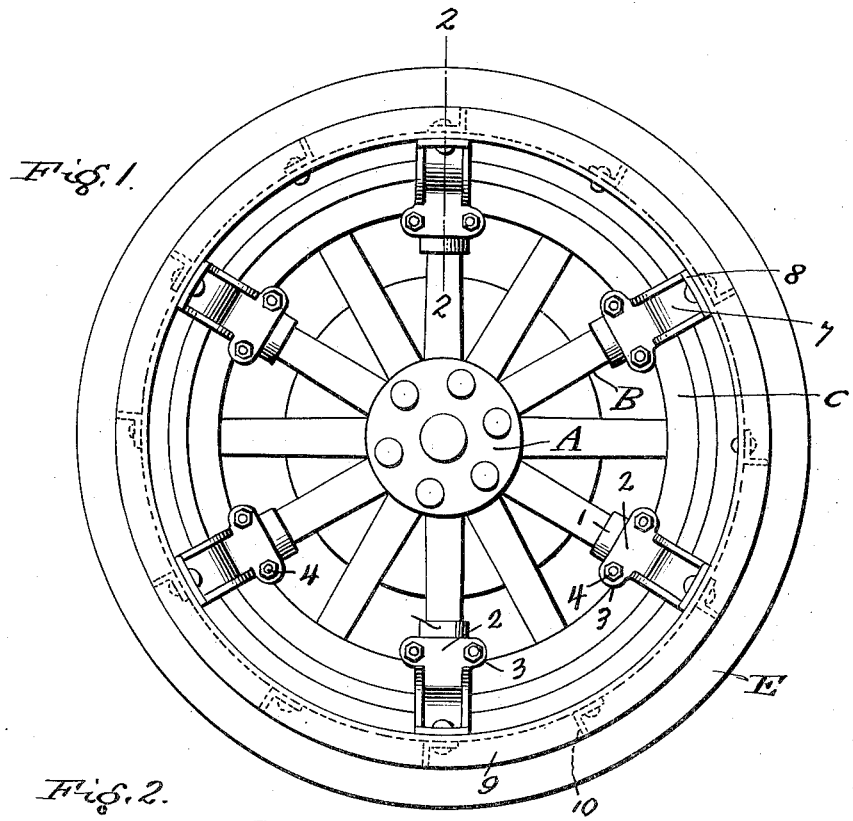
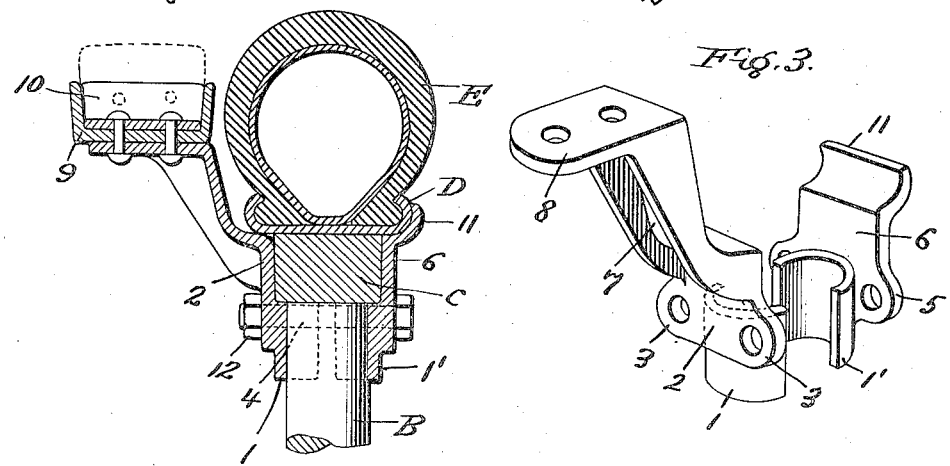
John Peterson and Henry Peters
INVENTORS
BY Victor J. Evans
ATTORNEY
WITNESS: Gerald Hennesy Jr.

Patented Feb. 9, 1926.

1,572,806

UNITED STATES PATENT OFFICE.

JOHN PETERSON AND HENRY PETERS, OF WINAMAC, INDIANA.

WHEEL ATTACHMENT.

Application filed June 19, 1925. Serial No. 38,297.

*To all whom it may concern:*

Be it known that we, JOHN PETERSON and HENRY PETERS, citizens of the United States, residing at Winamac, in the county of Pulaski and State of Indiana, have invented new and useful Improvements in Wheel Attachments, of which the following is a specification.

This invention relates to traction devices for vehicle wheels and is an improvement on my pending application Serial No. 743,406.

The primary object of the invention is to provide an attachment for wheels that enables traction thereof in snow, soft ground, mud and the like.

A further object is to provide an attachment for wheels in the nature of a traction device that can be adjustably connected therewith in an expeditious manner and includes means detachably fixed to the spokes of the wheel.

Another object is to provide an attachment for wheels that is not only adapted to receive cleats or the like for increasing or enabling the traction of the wheels but also includes means whereby a tire rim can be associated with a plurality of the attachments if it is desired to use an auxiliary tire in cooperation with the usual tire equipment.

This invention also consists in certain other features of construction and in the combination and arrangement of the several parts, to be hereinafter fully described illustrated in the accompanying drawings and specifically pointed out in the appended claims.

In describing our invention in detail, reference will be had to the accompanying drawings wherein like characters denote like or corresponding parts throughout the several views, and in which:

Figure 1 is a side elevation of the usual pneumatic tire equipped wheel showing the application of my improvement.

Figure 2 is a sectional view taken on line 2—2 of Figure 1.

Figure 3 is a perspective view of the attachment per se with the fastening means removed.

Referring to the drawings in detail the vehicle wheel illustrated includes the hub A, spokes B, felly C, a rim D and a pneumatic tire E of the conventional type.

As shown the attachment is adapted to be associated in numbers to some of the spokes B of the vehicle wheel and each attachment includes cooperating semi-circular spoke engaging members 1 and 1'. The member 1 has integrally formed adjacent one end thereof a plate 2 which is formed with apertured ears 3 for receiving bolts 4 adapted to be also passed through apertured ears 5 formed on a plate 6 which is integral with the companion member 1' as clearly shown in Figure 3 of the drawings.

Rising from the plate 2 at an outward inclination therefrom is an arm 7 which is formed substantially U-shaped in cross section and has its upper end arranged at right angles to provide a cleat or rib engaging portion 8. The cleat or rim engaging portion 8 is formed with openings to receive rivets or the like for securing the rim 9 thereto as suggested in Figure 2 of the drawings as well as a substantially angle shaped cleat 10 if desired.

The free end of the plate 6 is curved upon itself to provide a rim engaging portion 11, whereby when the members are operatively associated as shown in Figure 2 the portion 11 will snugly engage the inner edge of the beaded portion of the rim and prevent any casual displacement thereof as will be readily apparent. The lower portion of the arm 7 also follows the surface of the felly so as to provide a substantial engaging means therebetween.

As above set forth the attachment is formed from companion members adapted to be cooperatively associated with the spokes of the wheel and the bolts 4 pass through the apertured ears to receive nuts 12 for securely fastening the attachments to the spokes.

From the foregoing it will be apparent that the attachment when secured to the spokes in numbers as suggested in Figure 1 can have fixed to the cleat or rim engaging member 8 the rim 9 for receiving the auxiliary tire as shown in dotted lines in Figure 2 or the cleats 10 which of course are adapted to provide the wheel with the necessary traction for enabling the same to pass through snow, soft ground, mud and the like and also preventing cutting of the tire which usually takes place by spinning of the wheel and coming in contact with substances above referred to.

It is thought from the foregoing description that the advantages and novel features of my invention will be readily apparent.

We desire it to be understood that we may make changes in the construction and in the combination and arrangement of the several parts, provided that such changes fall within the scope of the appended claims.

What we claim is:

1. A wheel attachment of the character described comprising companion members adapted to be secured to the spoke of the wheel, an arm included in one of said members and means formed on said arm for securely receiving a rim and a traction cleat.

2. A wheel attachment of the character described comprising cooperatively associated semi-circular members adapted to embrace a spoke of the wheel, plates formed on the opposite sides of each semi-circular member for receiving bolts for securing the same to the spoke, a rim bead engaging portion formed on one of said plates, an arm formed on the other of said plates, and means formed on the end of said arm for receiving a cleat or a rim.

3. A wheel attachment of the character described comprising substantially semi-circular members associated in a manner to embrace the spokes of the wheel, plates integrally formed with each of said semi-circular members, apertured ears formed on each plate, means passing through the apertured ears for securing the members to the spokes, a rim bead engaging portion formed on one of said plates, an arm extending at an inclination from the other of said plates, an apertured flattened portion formed on the free end of said arm and being adapted to receive a tire rim and means for securing said tire rim thereto.

In testimony whereof we affix our signatures.

JOHN PETERSON.
HENRY PETERS.